United States Patent
Bowden et al.

(10) Patent No.: US 9,285,898 B2
(45) Date of Patent: Mar. 15, 2016

(54) COMPUTER INPUT DEVICE

(76) Inventors: James Patrick Bowden, Sidcup (GB); Stephen Anthony Bowden, Sidcup (GB)

(*) Notice: Subject to any disclaimer, the term of this patent is extended or adjusted under 35 U.S.C. 154(b) by 509 days.

(21) Appl. No.: 13/390,842

(22) PCT Filed: Aug. 11, 2010

(86) PCT No.: PCT/GB2010/001525
§ 371 (c)(1),
(2), (4) Date: Feb. 16, 2012

(87) PCT Pub. No.: WO2011/020990
PCT Pub. Date: Feb. 24, 2011

(65) Prior Publication Data
US 2012/0146909 A1 Jun. 14, 2012

(30) Foreign Application Priority Data

Aug. 21, 2009 (GB) .................................... 0914639.0
Jan. 19, 2010 (GB) .................................... 1000810.0

(51) Int. Cl.
*G06F 3/033* (2013.01)
*G06F 3/0354* (2013.01)

(52) U.S. Cl.
CPC .... *G06F 3/03543* (2013.01); *G06F 2203/0332* (2013.01); *G06F 2203/0334* (2013.01)

(58) Field of Classification Search
CPC .......................................... G06F 3/033–3/0334
USPC .................................. 345/156–184
See application file for complete search history.

(56) References Cited

U.S. PATENT DOCUMENTS

| 5,576,733 | A | * | 11/1996 | Lo ........................ G06F 3/03543 345/163 |
| 5,648,798 | A |   | 7/1997  | Hamling |
| 6,072,471 | A | * | 6/2000  | Lo ........................ G06F 3/03543 341/20 |

(Continued)

FOREIGN PATENT DOCUMENTS

| AT | 7780 U1 | 8/2008 |
| CN | 200990072 Y | 12/2007 |

(Continued)

OTHER PUBLICATIONS

Jason Dumbaugh, Evoluent Vertical Mouse 3 Rev. 2, Aug. 21, 2007, pp. 1-5.*

(Continued)

*Primary Examiner* — Carolyn R Edwards
(74) *Attorney, Agent, or Firm* — Morgan, Lewis & Bockius LLP

(57) ABSTRACT

A computer input device (10), typically a mouse, having a body (12) with a generally planar base (14) for resting on a work surface, the body (12) being elongate in a direction extending away from the base and having a thumb support ledge (41) defining a thumb surface (40) for engagement by only the tip of a thumb (60) of a user and an opposed finger surface (42, 44) for engagement by only the tip of one or more fingers (62, 64) of the user, wherein the thumb support ledge (41) is located a distance in the range 15 to 30 mm above the base, with the spacing between the thumb surface (40) and the finger surface (42, 44) being in the range 8 to 40 mm. The body (12) is preferably symmetrical about a plane perpendicular to the base (14) so that the device (10) can be held either by a right hand (58) or left hand of the user.

7 Claims, 5 Drawing Sheets

(56) References Cited

U.S. PATENT DOCUMENTS

| | | | |
|---|---|---|---|
| 6,300,941 B1 | 10/2001 | Segalle | |
| 2002/0105500 A1* | 8/2002 | Edwards | G06F 3/03543 345/163 |
| 2003/0160765 A1 | 8/2003 | Gordon | |
| 2005/0248533 A1 | 11/2005 | Chu | |
| 2008/0042041 A1 | 2/2008 | Cheah et al. | |
| 2008/0095891 A1 | 4/2008 | Aldred et al. | |
| 2008/0100573 A1 | 5/2008 | Lo | |

FOREIGN PATENT DOCUMENTS

| | | | |
|---|---|---|---|
| WO | 98/59316 A1 | 12/1998 | |
| WO | 00/29933 A1 | 5/2000 | |
| WO | 2005/022374 A1 | 3/2005 | |
| WO | 2007/015618 A1 | 2/2007 | |

OTHER PUBLICATIONS

"Wow-pen joy mouse—An ergonomically designed mouse" techno-angel.blogspot.com. Feb. 2008.

Wow-Pen: "Wow-Pen Joy, Superior Ergonomic PC Mouse" www.wow-pen.com. Jan. 2009.

Dumbaugh, Jason. "Evoluent Vertical Mouse 3 Revision 2" TechwareLabs.com. Aug. 2007.

International Search Report from corresponding International Application No. PCT/GB2010/001525 mailed Apr. 2, 2011.

Written Opinion from corresponding International Application No. PCT/GB2010/001525 mailed Apr. 2, 2011.

Search Report for GB Application No. GB100810.0 dated Nov. 29, 2010.

Search Report for GB Application No. GB0914639.0 dated Nov. 2, 2009.

\* cited by examiner

COMPUTER INPUT DEVICE

The present application is a U.S. National Phase Application of International Application PCT/GB2010/001525, filed Aug. 11, 2010, which claims the benefit of priority of Great Britain Application No. 1000810.0, filed Jan. 19, 2010 and Great Britain Application No. 0914639.0, filed Aug. 21, 2009, the disclosures of which are incorporated herein by reference in their entireties.

FIELD OF THE INVENTION

This invention relates to a computer input device, particularly an electronic computer input device such as a so-called mouse, typically for controlling the position of a pointer or cursor of a graphical user interface.

BACKGROUND TO THE INVENTION

Computer mice are widely used as computer input devices, but have been implicated in a variety of upper limb disorders including repetitive strain injuries (RSIs), often attributed to mouse designs that require the hand and wrist of a user to be held in a position that is generally towards full pronation, i.e. with the palm facing down and held generally parallel to a work surface on which the mouse is located, and with the fingers and thumb splayed out over the mouse. Attempts have been made to produce alternative designs of mouse.

For example, U.S. Pat. Nos. 6,396,479 and 6,795,058 disclose small body mouse designs intended to be gripped between the tips of the thumb and fingers of the user, but that still require the hand and wrist of the user to be in a generally pronated position.

Another approach uses relatively bulky bodies held in contact with the surface of the palm and extended fingers of a user in a so-called handshake grip. See, e.g. U.S. Pat. Nos. 5,648,798, 5,576,733 and 6,072,471. In general, such devices are manipulated by muscles in the upper limb that are physiologically better suited to gross movements rather than precision form of movements that are often required when manipulating a mouse. Any scope for movement of the devices by flexing of fingers and thumb is of extremely limited extent.

It is also known to use relatively slender, pen-type bodies held in a pencil-type pinch grip, e.g. as disclosed in WO 2005/022374 and US 2003/0160765. The pencil-type pinch grip involves gripping an object between the tips of the index finger and thumb and the side of the middle finger. This grip tends to involve the forearm in more pronation than is ideal and that will increase the use of ulnar and radial deviation movements of the wrist, which are known to be associated with strain of the muscles and tendons of the forearm.

The present invention seeks to provide an alternative approach to computer input device design.

SUMMARY OF THE INVENTION

According to the present invention there is provided a computer input device comprising a body having a generally planar base for resting on a work surface, the body extending away from the base and having a thumb support ledge defining a thumb surface for engagement by only the tip of a thumb of a user, and an opposed finger surface for engagement by only the tip of one or more fingers of the user, wherein the thumb support ledge is located a distance in the range 15 to 30 mm above the base, with the spacing between the thumb and finger surfaces being in the range 8 to 40 mm. The term "tip" in relation to a finger or thumb is used herein to mean the flexor aspect of the pad of the finger or thumb tip.

The dimensional constraints on the device mean that, in use, with the tip of the thumb of the hand of a user resting on the support ledge and the thumb surface, and the tips of one or more fingers (typically the index and middle fingers) resting on the opposed finger surface, the hand of the user naturally adopts a position in which the fingers and thumb are flexed, and the side of the wrist, the side of the hand and the adjacent edge of the palmar surface rest on a work surface on which the mouse is located. The hand and wrist adopt a position in avoidance of full pronation, such that the palm is generally halfway between being parallel to the work surface and at a right angle to the work surface. The body of the device is generally contacted by only the tips of the thumb and the tips of one or more fingers, typically the index and middle fingers, with no contact with the palm of the hand. The fingers and thumb are in generally opposed relationship, with the fingers and thumb flexed and the fingers pointing in a somewhat downwardly inclined direction towards the work surface, typically at an angle of about 25° from horizontal, facilitating adoption of the so-called precision grip. This grip is well known to those with a knowledge of the kinetics of the hand and is well suited to accurately controlled precise movements (both gross and fine) by flexing of the fingers and thumbs without undue strain on the musculo-skeletal system of the upper limb. The precision grip is to be distinguished from the pencil-type pinch grip as discussed above, which is a modification of the precision grip involving the side of the middle finger.

The body of the device may be moved in the space between the thumb and fingers by flexing the joints of these digits to cause movement of the device with respect to the work surface, towards and away from the user's palm. Such movement need not require whole hand movements, nor shoulder movements, and so can reduce stresses on the musculoskeletal system of a user. In addition, the grip is well suited to both small scale fine precision positioning of the device and larger scale movements. Moreover, this grip facilitates use of the device on the centre line of the user's body, which is of benefit where very precise control of movement of the device is required.

Further, by designing the device so it is gripped between the tips of the thumb and fingers of a user, i.e. those parts of the hand with maximum sensory input and sensitivity, so maximum sensory input and control of the device can be obtained allowing for delicate and precise control and adjustment.

The device is thus held in a manner which avoids movement towards full pronation of the hand and wrist and hence reduces the likelihood of the device causing upper limb disorders. Further, the device is dimensioned such that the hand of a user naturally tends to adopt a precision grip, with benefits as noted above.

The device is dimensioned to be usable by a wide range of hand sizes.

The body is conveniently elongate, having a height that is greater than the space in between the thumb surface and the finger surface, with the thumb and finger surfaces on generally opposed faces of the upstanding body, referred to herein as the front surface (including the finger surface) and the rear surface (including the thumb surface). The front and rear surfaces are typically linked by two side surfaces.

The thumb surface is preferably concave. This can assist in location of the tip of the thumb.

The finger surface is preferably convex. This can assist in comfortable placement of the tip of the one or more fingers.

The finger surface is preferably convex in a side to side, horizontal direction and/or in a top to bottom, vertical direction, and is preferably bi-convex as this facilitates adoption of beneficial finger positioning by a user, with the fingers flexed and progressively offset or lapped under one another (progressing from index finger towards the little finger) both in horizontal and vertical planes, thus maintaining an optimal posture for efficient and precise movement production.

The front surface of the body is preferably undercut at the base, to provide space to accommodate the lower finger or fingers of a user, also in flexed, lapped condition as discussed above.

The thumb and finger surfaces are in opposed relationship, preferably being generally horizontally opposed. The mid point of the thumb surface and the mid point of the finger surface are preferably generally horizontally aligned.

The finger surface is desirably designed to accommodate at least two fingers, on upper and lower portions of the finger surface, and the device is preferably such that the spacing between the thumb surface and the upper portion of the finger surface is less than the spacing between the thumb surface and the lower portion of the finger surface, e.g. by an amount in the range 5-20%, for instance about 10%. This arrangement facilitates adoption of an ergonomically advantageous position by the fingers, with the fingers flexed and pointing in a slight downwards direction, and with the ends of the fingers lapped as discussed above.

To this end, the body preferably tapers inwardly between the front and rear surfaces, in an upwards direction from the base. The taper is preferably curved.

The body preferably also tapers inwardly in width, between the side surfaces, in an upwards direction from the base. The taper is preferably curved.

The rear surface of the body is desirably concave in the top to bottom direction, with the thumb surface constituted by a recessed concavity (both in the top to bottom and side to side directions) within the surface.

The front surface of the body is desirably convex in the top to bottom direction and/or side to side direction, preferably in both directions.

Both the front and rear surfaces are desirably curved, and preferably both curve in a rearwards direction, with the front surface preferably undercut at the base as discussed above.

The body is preferably symmetrical about a plane perpendicular to the base, passing through the thumb surface and the finger surface. This means that the device can be held either by a right hand or left hand of a user. In this case, the device includes appropriate circuitry and switch means so that movement of the device translates into appropriate computer input, e.g. movement of a cursor on a computer screen. The switch means conveniently comprises a push button to cycle between left-handed and right-handed conditions, preferably in association with a display, e.g. an LED, indicating the current mode of the device.

The front to back spacing (or depth) between the thumb and finger surfaces is preferably between 15 mm and 40 mm, more preferably between 20 mm and 35 mm, desirably being sufficiently large for accommodation of functionalities, e.g. buttons, scroll wheel etc, and for ease of use.

The side to side spacing (or width) transverse to the depth of the device is preferably dimensioned so that the device can fit comfortably in the gap between the thumb and fingers of a user, leaving a space in which the device can be manipulated towards and away from the palm of a user by flexing the fingers and thumb. To this end, the distance between the centre of the thumb surface and the horizontally adjacent edge of the body is preferably less than 50 mm, more preferably less than 40 mm, yet more preferably less than 30 mm. In the case of a symmetrical device, the overall width of the device is preferably less than 100 mm, more preferably less than 80 mm, yet more preferably less than 70 mm, and furthermore preferably less than 60 mm.

The device preferably includes switch means underlying the finger surface for operation by finger pressure. Such switch means conveniently comprise one or more relatively moveable portions constituting "buttons" on the convex finger surfaces, preferably two buttons for operation by index and middle fingers. Surprisingly, it is found that the device can be manipulated by gripping the buttons without resulting in accidental operation of the buttons moving the device. In a symmetrical, ambidextrous embodiment, the buttons preferably extend across the full width of the device, providing relatively large areas on which the finger tips of a user may be positioned and so facilitating adoption of a comfortable hand position.

A scroll wheel is desirably provided in the finger surface. Where the finger surface is provided with two buttons (constituted by upper and lower portions of the finger surface) for operation by index and middle fingers, the scroll wheel is preferably provided between the buttons. The scroll wheel is preferably horizontally aligned with the centre of the thumb surface. The scroll wheel is preferably orientated for rotation in a generally horizontal plane. The scroll wheel is preferably of larger diameter than usual, e.g. having a diameter of around 30 mm, as this reduces the force required to rotate the scroll wheel and hence reduces the tendency of the device to rotate during operation of the scroll wheel.

The device preferably has switch means (and appropriate circuitry) to alter the resolution of the device, e.g. between 400, 800 and 1600 dpi resolution settings, e.g. in the form of a push button, preferably with an associated display, such as one or more LEDs, indicating the resolution of the device.

The device preferably includes memory means to store settings of the device, such as the sense of the device (left-handed or right-handed) and the resolution so that these are retained when the device is not connected to a powered computer.

The device may include a wire for connection to a computer in a conventional manner, or may be arranged for wireless operation, in known manner.

In a further aspect the invention provides a computer input device comprising a body having a generally planar base for resting on a work surface, the body being elongate in a direction extending away from the base and having a thumb surface for engagement by only the tip of a thumb of a user and an opposed finger surface for engagement by only the tip of one or more fingers of the user, with the hand of the user resting on the work surface with the side of the hand and wrist in contact with the work surface. The thumb surface is desirably positioned at a location between 30 mm and 70 mm vertically above the work surface, with the finger surface in generally opposed relationship.

A preferred embodiment of a computer mouse in accordance with the invention will now be described, by way of illustration, with reference to the accompanying drawings, in which.

DETAILED DESCRIPTION OF THE DRAWINGS

Figure 1:
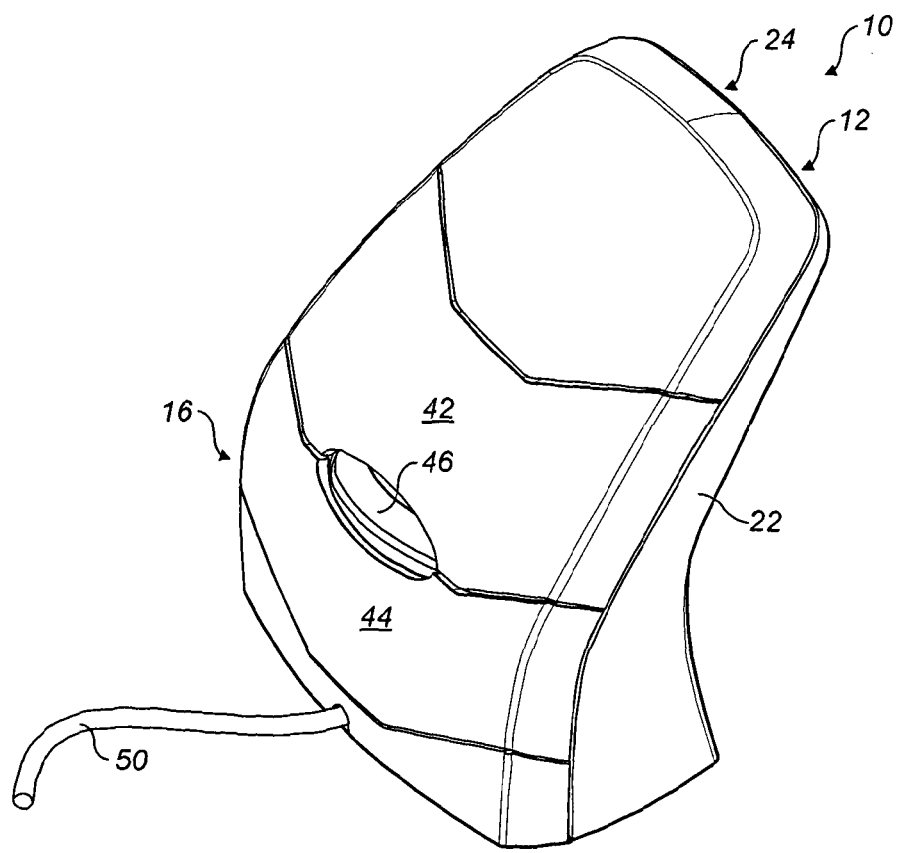
FIG. 1 is a perspective view of a computer mouse embodying the invention.
Figure 2:
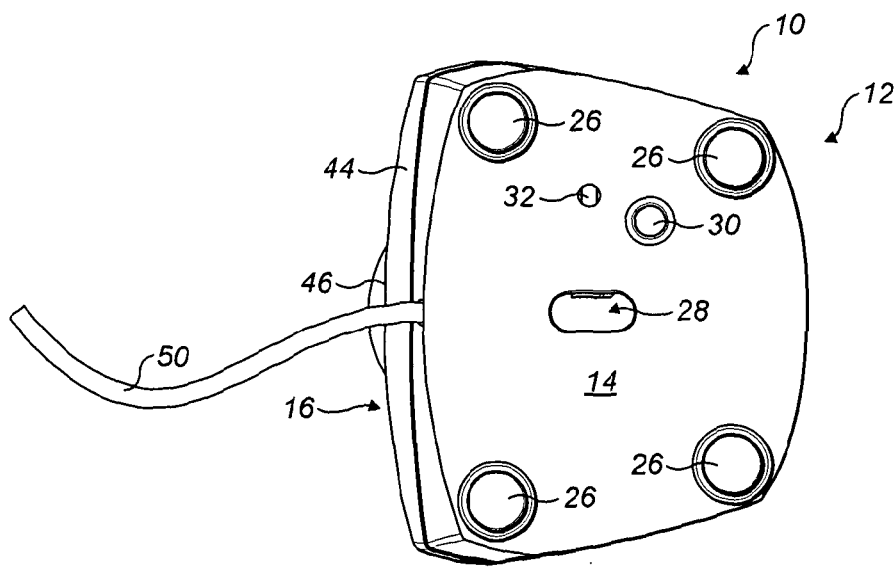
FIG. 2 is an underneath plan view of the mouse of FIG. 1.
Figure 3:
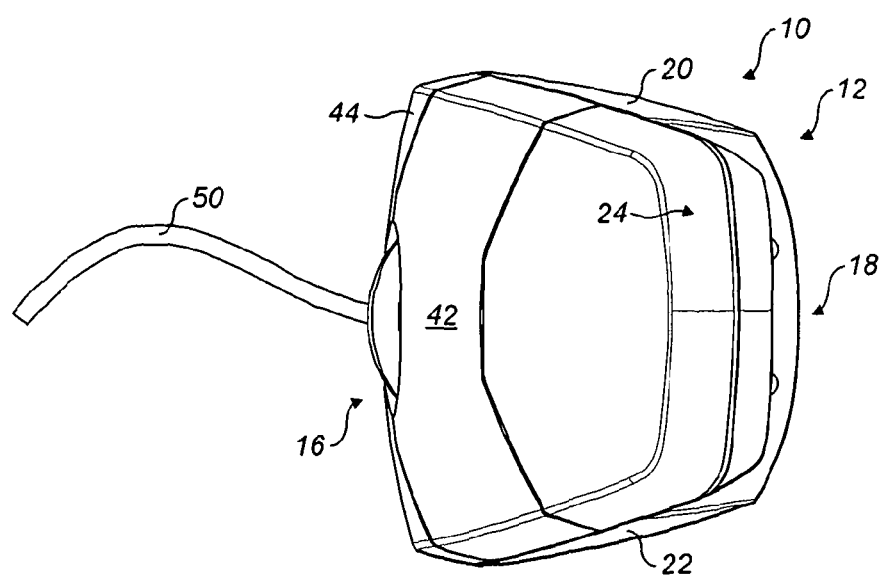
FIG. 3 is a top plan view of the mouse of FIG. 1.
Figure 4:
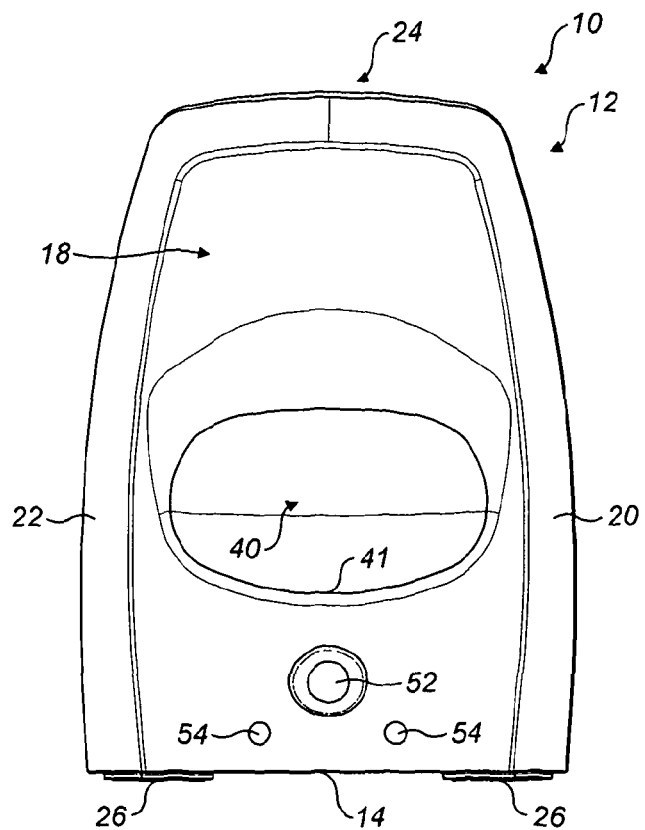
FIG. 4 is a rear view of the mouse of FIG. 1.
Figure 5:
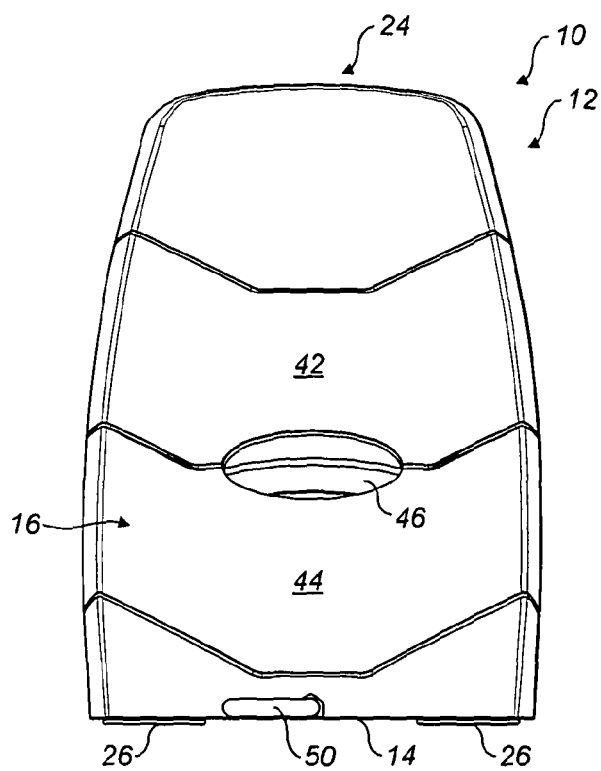
FIG. 5 is a front view of the mouse of FIG. 1.

Referring to the drawings, a computer mouse 10 comprises an elongate, upstanding body 12 of rigid moulded plastics materials. The body 12 includes a generally planar base surface 14, a bi-convex curved front surface 16 (convex in both top to bottom and side to side directions) and a concave curved rear surface 18 (concave in the top to bottom direction), two similar slightly upwardly tapering side surfaces 20, 22 and a top surface 24. The body is symmetrical about a plane extending perpendicular to the base surface 14, through the front, rear and top surfaces, 16, 18 and 24, respectively.

The base surface 14 is of generally rectangular configuration, with a maximum width (between the side surfaces 20 and 22) of 58 mm and a maximum depth (front surface 16 to rear surface 18) of 45 mm. The base surface 14 is provided with a low friction pad 26 at each corner to facilitate sliding of the mouse on the base surface across the work surface (not shown). An optical motion sensor (not shown) forming part of a Cypress Semiconductor Corporation CYONS-2000 integrated circuit is set behind a laser aperture 28 in the base surface to measure movement of the mouse across the work surface. A resolution select switch 30 is provided in the base surface for adjusting the resolution, between 400, 800 and 1600 dpi resolution settings, with an associated resolution indicator in the form of a tricolour LED 32.

The body 12 is of elongate, upstanding, generally tapering form, tapering inwardly both in width (between the side surfaces 20 and 22) and depth (between the front and rear surfaces 16 and 18), in a direction extending upwardly from the base surface 14, with both the front and rear surfaces 16 and 18 curving rearwardly, and has a height of about 78 mm.

The rear surface 18 is generally rectangular, tapering slightly inwardly in an upwards direction, and is concave in form in the top to bottom direction. The surface 18 includes a curved recess that is biconcave both in the top to bottom direction and the side to side direction, defining a concave thumb surface 40, the lower edge of which constitutes a thumb support ledge 41 located 19.58 mm vertically above the base, for engagement by the tip of a thumb of a user. The centre of the thumb surface is located approximately 30 mm vertically above the base surface.

The front surface 16 is also generally rectangular, tapering slightly inwardly in an upward direction, and is bi-convex in form, both in the top to bottom direction and the side to side direction, defining a first finger surface 42 for engagement by the tip of an index finger of a user and a second finger surface 44 for engagement by the tip of a middle finger of a user. The finger surfaces 42, 44 are formed by relatively moveable portions extending across the full width of surface 16, constituting mouse "buttons" that may be clicked by appropriate pressure of the finger tip of a user, causing a corresponding operation on an associated computer (not shown). Surprisingly it has been found that the mouse can be manipulated by gripping the buttons without resulting in accidental operation of the buttons when moving the mouse. The curvature of the front surface 16 is such that the base is undercut, as shown at 45.

Figure 6:
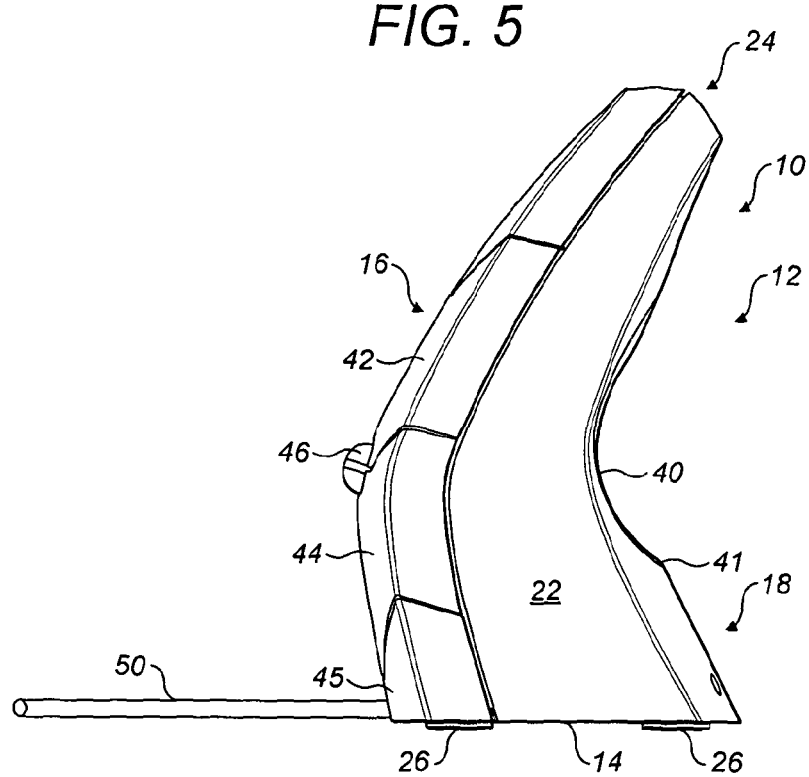
FIG. 6 is a side view of the mouse of FIG. 1.

The radius of curvature of the front surface 16 in the vertical plane varies between the centre of respective finger surfaces 42, 44 and the centre of the thumb surface 40, as shown in FIG. 6, to achieve consistent functioning of the two finger surfaces (e.g. left and right click).

A scroll wheel 46, having a diameter of 30 mm, is symmetrically located between the first and second buttons 42, 44. The scroll wheel 46 is oriented for rotation in a horizontal plane, and is on the same horizontal level as the centre of the thumb surface 40.

The front-rear spacing between the thumb and finger surfaces is about 25 to 35 mm with the spacing between the centre of the thumb surface and the centre of the first finger surface 42 being about 28.7 mm, and the spacing between the centre of the thumb surface 40 and the centre of the second finger surface 44 being about 31.9 mm. The spacing between the thumb surface and the first finger surface is thus 10.03% less than the spacing between the thumb surface and the second finger surface.

Cable 50 for connection of the mouse to an associated computer (not shown) extends from the centre of the bottom of the front surface 16.

The mouse 10 is symmetrical about a plane extending perpendicular to the base surface 14, through the front surface 16, rear surface 18 and top surface 24, and is designed to be used by either the left hand or right hand of a user, thus constituting an ambidextrous mouse.

A mode switch 52 in the form of a push button is provided on the rear surface 18, below the thumb surface 40, for switching the mouse between left-handed and right-handed operation modes, with associated mode indication LEDs 54, 56. The optical motion sensor and a rotary encoder (not shown) to which the scroll wheel 46 is connected include appropriate circuitry (not shown) so that movement axes and scroll wheel direction are reversed and translated into appropriate computer input for the selected handedness of operation of the mouse.

The mouse also includes memory means (not shown) to store settings of the sense (left-handed or right-handed) and resolution, so that these are retained in the mouse, without the need for an associated powered computer.

Figure 7:
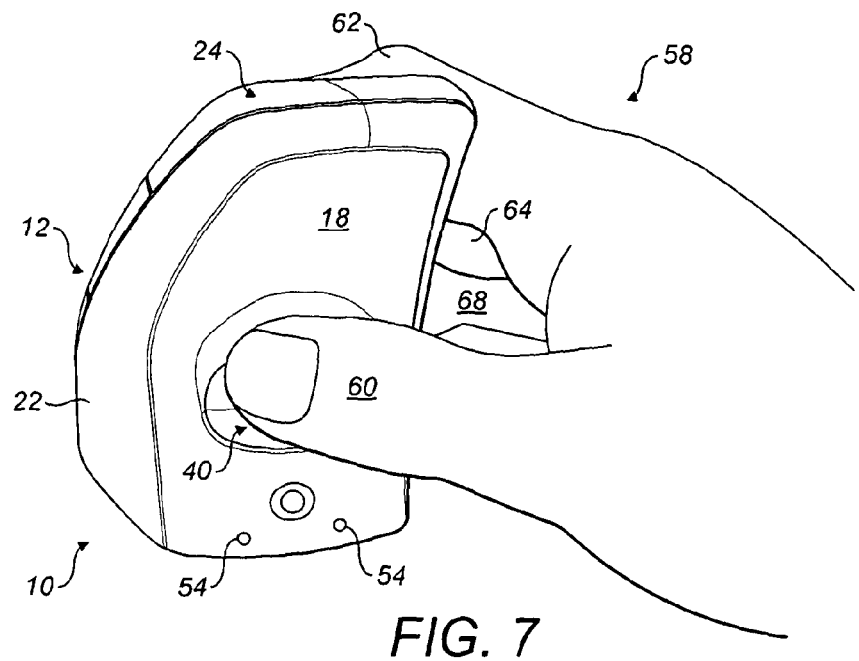
FIGS. 7 and 8 are perspective views from behind and in front, respectively, of the mouse of FIGS. 1 to 6 held in the right hand of a user of the mouse.
Figure 8:
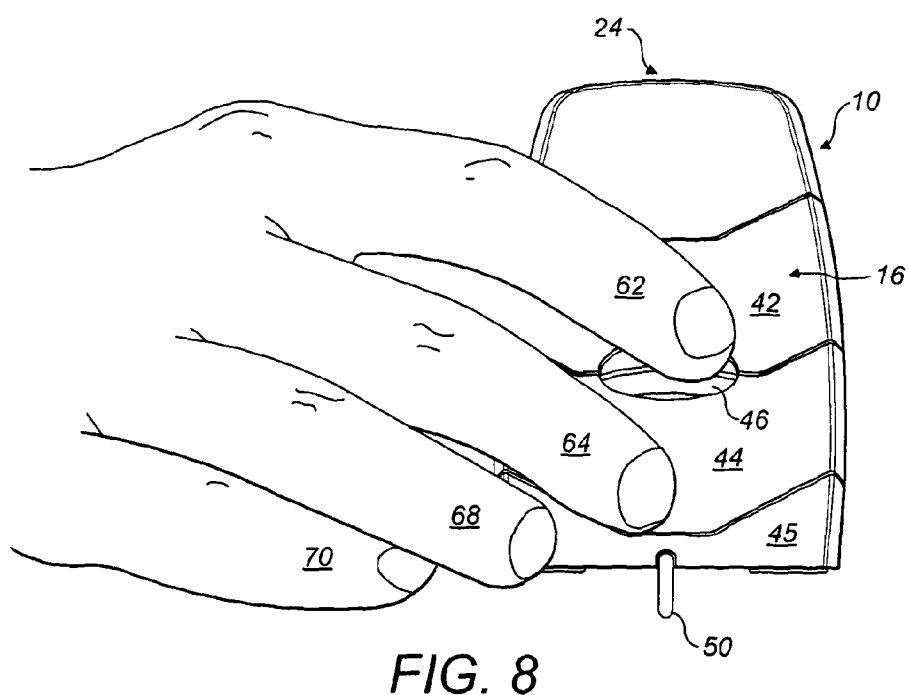
Figure 9:
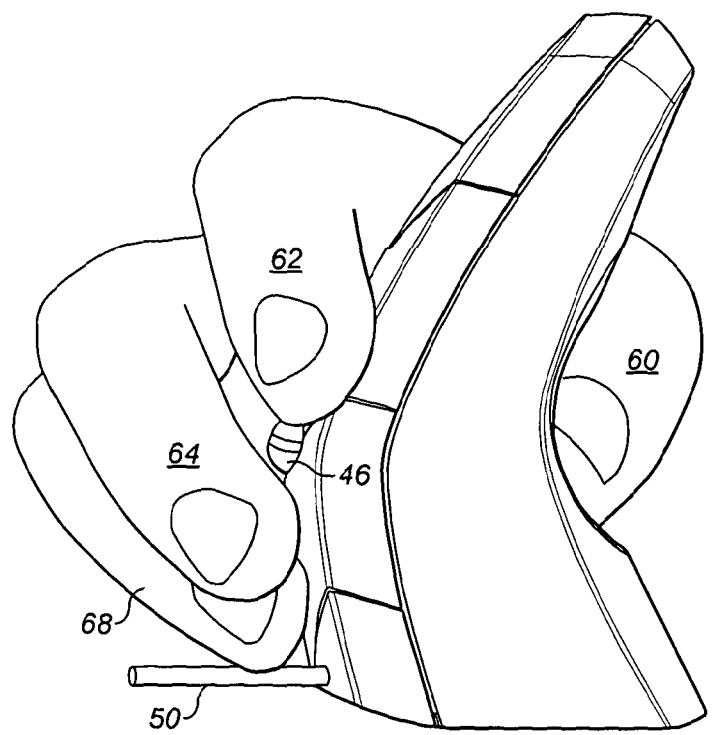
FIG. 9 is a side view of the mouse of FIGS. 1 to 6 held in the right hand of a user of the mouse.

In use of the mouse 10, the body 12 is gripped by a selected hand (in this instance a right hand 58) of a user, with the tip of the thumb 60 (i.e. the flexor aspect of the pad at the thumb tip) engaging the thumb surface 40 and thumb support ledge 41 (and exerting force mainly in a horizontal direction, but with some downwards component) and the tips of the index finger 62 and middle finger 64 (i.e. the flexor aspects of the pads at the finger tips) engaging the buttons 42, 44 in a precision grip, as shown in FIGS. 7 to 9. The fingers and thumb are flexed, and the ulnar sides of the wrist and hand 58 and the adjacent edge of the palmar surface rest on the work surface, with the wrist and hand thus avoiding a fully pronated condition. The fingers 62 and 64 are pointed in a somewhat downwardly inclined direction, typically at angle of about 25° from horizontal, with the ends of the fingers progressively offset or lapped under one another, progressing from index finger downwards, both in horizontal and vertical planes. The body is generally contacted by only the tips of the thumb and operating fingers, with no contact with the palm of the hand. Switch 52 is operated to place the mouse into the appropriate operating condition (i.e. for right-handed use).

The mouse 10 can be used either with both the ring finger 68 and little finger 70 curled into the palm of the hand 58 or with only the little finger 70 curled into the palm of the hand and the ring finger 68 engaged with the portion 45 of the front surface 16 of the mouse that adjoins the base surface 14, as shown in FIG. 8. With the ring finger 68 engaged with this portion of the front surface 16 the ring finger 68 can also be engaged with the work surface, which can help when very precise control of movement of the mouse is required.

By flexing the joints of the thumb and fingers, the mouse (and hence an associated cursor of a graphical user interface) can be moved across the work surface in the space between the thumb 60 and fingers 62 and 64, towards and away from the palm of the user. The mouse can be easily manipulated with both small scale fine precision positioning as well as large scale movements in a way that is ergonomically beneficial and that need not involve whole hand movements nor shoulder movements, thus reducing stresses to the musculoskeletal system. Further, because the mouse is held in a way that avoids a position that is towards the end of forearm pronation, use of the mouse is less likely to result in upper limb disorders. The configuration of the mouse also means that it can be used on the centre line of the user's body, which is of benefit where very precise control of movement of the mouse is required. Large scale or gross movements of the mouse may also be produced by moving the entire hand with respect to the work surface.

The dimensions of the mouse mean that it is suited to use with a wide range of hand sizes.

In a modification, not shown, the thumb support ledge is extended outwardly from the rear surface 18 of the body.

The invention claimed is:

1. A computer input device comprising a body contacted by only the tips of the thumb and the tips of one or more fingers, with no contact with the palm of the hand, the body having a generally planar base for resting on a work surface and extending away from the base and having a thumb support ledge defining a thumb surface for engagement by only the tip of a thumb of a user, and an opposed finger surface for engagement by only the tip of one or more fingers of the user, wherein the thumb support ledge is located a distance in the range 15 to 30 mm above the base, with the spacing between the thumb and finger surface being in the range 8 to 40 mm, wherein the body is symmetrical about a plane perpendicular to the base, passing through the thumb surface and finger surface, wherein upper and lower portions of the finger surface extend across the full width of the device and constitute buttons of switch means for operation by finger pressure, with a scroll wheel being provided between the upper and lower portions of the finger surface, for rotation in a horizontal plane, wherein the width of the device, in a direction transverse to the spacing between the thumb and finger surfaces, is not more than 70 mm, wherein the body tapers inwardly between a front surface including the finger surface and a rear surface including the thumb surface, in an upward direction from the base, over the full height of the device from the base upwards, wherein the rear surface is concave in the top to bottom direction, with the thumb surface constituted by a recessed concavity within the rear surface, and wherein the front and rear surfaces are curved in a rearwards direction over the full height of the device.

2. The computer input device according to claim 1, wherein the finger surface is convex.

3. The computer input device according to claim 2, wherein the finger surface is bi-convex.

4. The computer input device according to claim 1, wherein the spacing between the thumb surface and an upper portion of the finger surface is less than the spacing between the thumb surface and a lower portion of the finger surface.

5. The computer input device according to claim 1, wherein the front surface of the body is undercut at the base.

6. The computer input device according to claim 1, wherein the scroll wheel has a diameter of about 30 mm.

7. The computer input device according to claim 1, wherein the thumb surface and the finger surface are generally horizontally opposed.

* * * * *